Jan. 8, 1952    G. A. LYON    2,581,424
WHEEL COVER
Filed Sept. 21, 1946    3 Sheets-Sheet 1
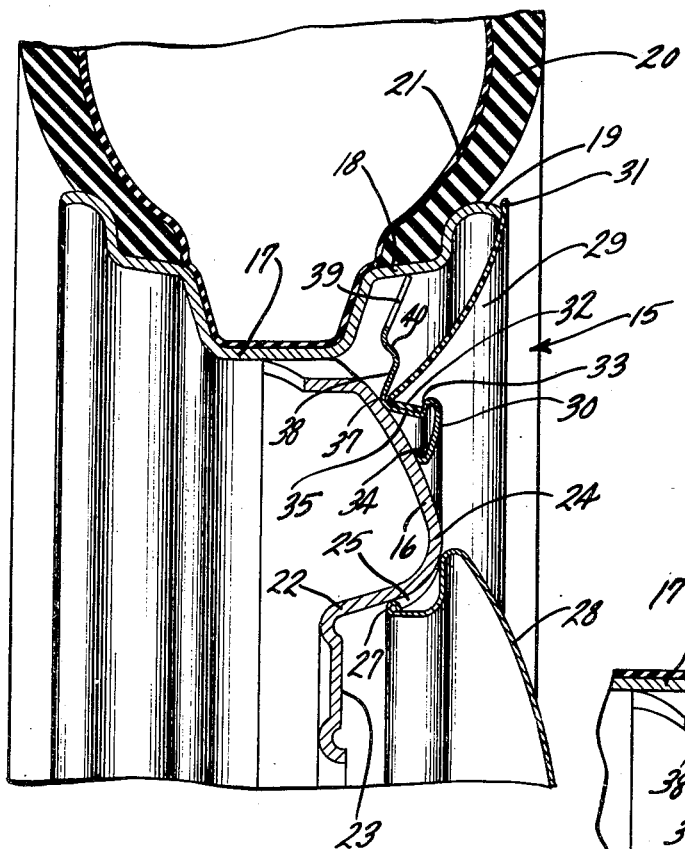
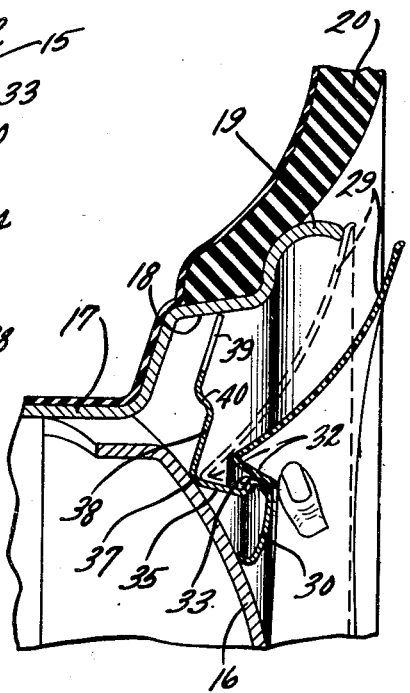
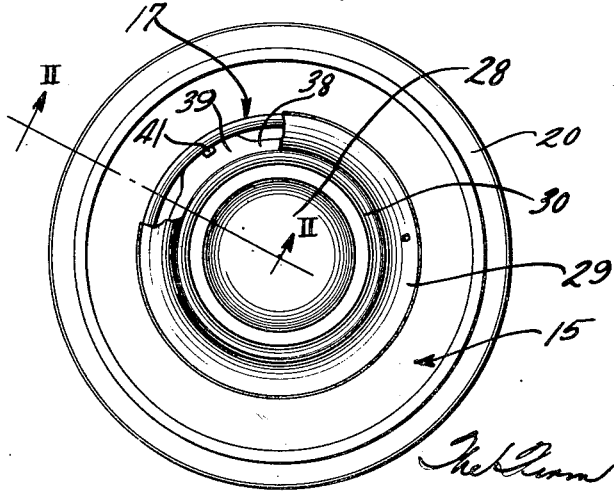
INVENTOR.
GEORGE ALBERT LYON
BY
ATTYS.

Jan. 8, 1952 G. A. LYON 2,581,424
WHEEL COVER
Filed Sept. 21, 1946 3 Sheets-Sheet 2

INVENTOR.
GEORGE ALBERT LYON
BY
ATTYS.

Jan. 8, 1952

G. A. LYON 2,581,424

WHEEL COVER

Filed Sept. 21, 1946

INVENTOR.
GEORGE ALBERT LYON
BY
ATTYS.

Patented Jan. 8, 1952

2,581,424

UNITED STATES PATENT OFFICE 2,581,424

WHEEL COVER

George Albert Lyon, Allenhurst, N. J.

Application September 21, 1946, Serial No. 698,585

10 Claims. (Cl. 301—37)

This invention relates to improvements in wheel structures and more particularly concerns novel wheel and cover assemblies and unique means for maintaining the assembled relationship thereof.

An important object of the invention resides in a wheel and cover assembly wherein the cover in whole or in part is readily replaceable.

Another object of this invention is to provide a new way of mounting a plastic trim ring.

A further object of the invention is to provide a novel cover construction including a plastic trim ring which is so constructed and related to means for retaining it on a wheel that while in service the trim ring is thoroughly held in assembled relationship to the wheel, but can be readily and easily disassembled or reassembled manually with the utmost facility.

Still another object of the invention is to provide a novel plastic trim ring and retaining means assembly.

It is also an object of the invention to provide a novel method of assembling and disassembling a flexible component and a more rigid component of a cover structure.

In accordance with the general features of this invention, there is provided for assembly with a wheel including a tire rim and a load-bearing part, a cover construction including a plastic trim ring which entirely conceals the tire rim and extends radially and axially inward toward the load-bearing part radially inwardly from the juncture of the load-bearing part and the tire rim and formed with an annular marginal flange which extends generally axially outwardly and slightly radially inwardly and interengages with an annular generally axially inwardly facing shoulder on retaining means in such a manner that under service conditions the trim ring is held quite thoroughly against displacement from the assembly but when it is desired to remove the trim ring this can be accomplished with the utmost facility by merely grasping an outer edge of the trim ring and turning the contiguous portion of the trim ring upon itself and pulling such turned portion radially inwardly, whereupon the inner marginal interlocking flange of the trim ring follows the turned portion, swings generally axially inwardly and turns out of the interlocking engagement with said shoulder, while at the same time the portions of the trim ring which flank the turned portion become distorted radially outwardly and the interlocking flange goes free from the shoulder and the trim ring falls away from the retaining means.

Another feature of the invention relates to the novel, interlocking relationship whereby an inner marginal flange on a trim ring member enters into assembled relationship with a generally axially inwardly facing retaining shoulder on a retaining member by a simple manipulation to flex the marginal flange into engagement with said shoulder.

Still another feature of the invention relates to a cover assembly including a plastic trim ring and a retainer therefor adapted to be applied more or less permanently to a wheel, while the trim ring has an inner marginal flange structure by which it is interlockingly assembled with a shoulder structure on the retaining member in such a manner that the trim ring can be assembled with the retaining member by an easy manipulation and can also be removed from the retaining member by easy manipulation merely by appropriately flexing the trim ring in either instance.

A still further feature of the invention resides in a cover assembly wherein an outer plastic trim ring member and an inner cover member are interlockingly assembled by the interengagement of an axially outwardly and radially inwardly extending inner marginal flange on the trim ring engaging a generally axially inwardly facing shoulder on the inner cover member and the inner cover member is adapted to be applied to a vehicle wheel in snap-on, pry-off fashion, the trim ring being flexible to open the same for access to the portion of the inner cover member which is concealed thereby and is adapted to be engaged by a pry-off tool, the plastic trim ring being easily replaceable by flexing a portion thereof to turn it upon itself and pulling it radially inwardly whereby to turn the inner marginal flange thereof out of the interlocking relationship to the shoulder on the inner cover member.

Other objects, features and advantages of the present invention will be fully apparent from the following detailed description of certain embodiments thereof, taken in conjunction with the accompanying three sheets of drawings in which:

Figure 1 is a side view of the wheel and cover assembly embodying the features of this invention, and showing the trim ring portion of the cover partially broken away in order to reveal the structure therebehind.

Figure 2 is an enlarged, fragmentary, radial, sectional view taken on substantially the line II—II of Figure 1.

Figure 3 is a fragmentary, cross-sectional view taken in substantially the same plane as Figure 2 but showing various steps in the application of the trim ring portion of the cover to the retaining portion of the cover structure.

Figure 4:
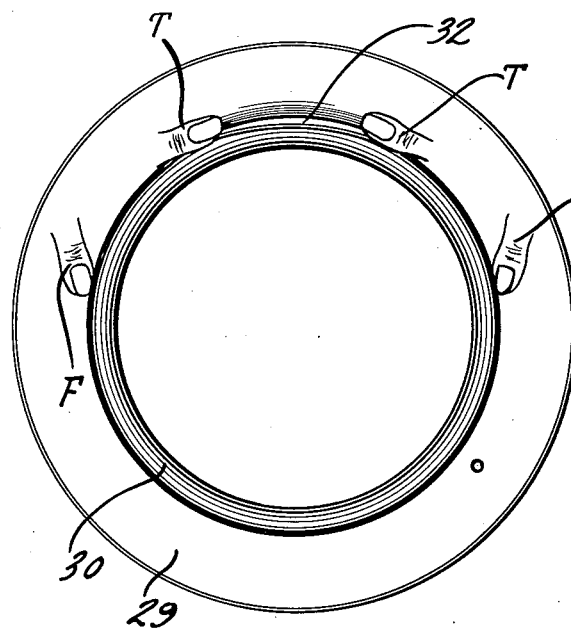

Figure 4 is a side elevational view of the cover showing the trim ring in process of being applied to the retaining member of the cover.

Figure 5:
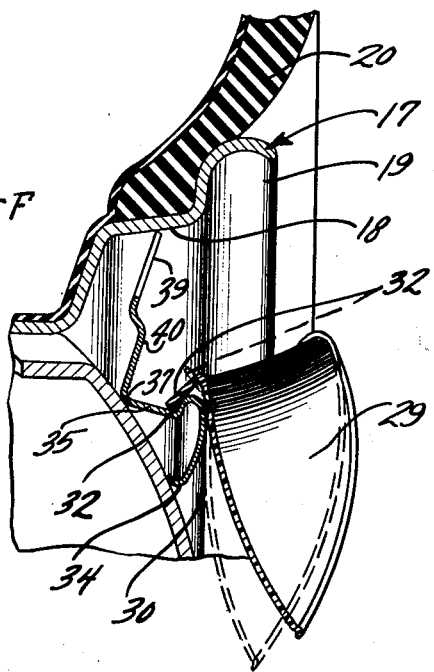

Figure 5 is a fragmentary, radial sectional view taken substantially in the same plane as Figure 3, but showing the trim ring in process of being removed from the retaining member.

Figure 6:
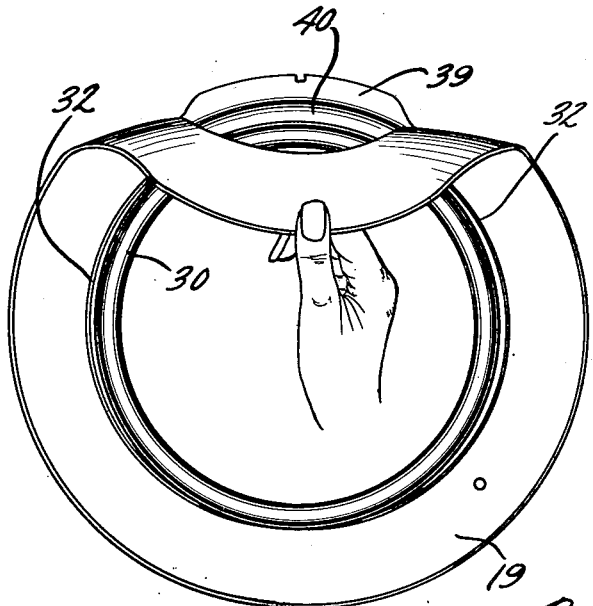

Figure 6 is a side elevational view of the cover showing the trim ring in process of being disengaged from the retaining member of the cover.

Figure 7:
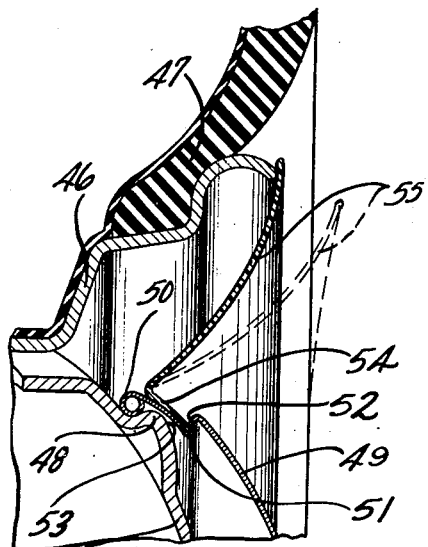

Figure 7 is a fragmentary, sectional view radially through a wheel and cover assembly of modified construction.

Figure 8:
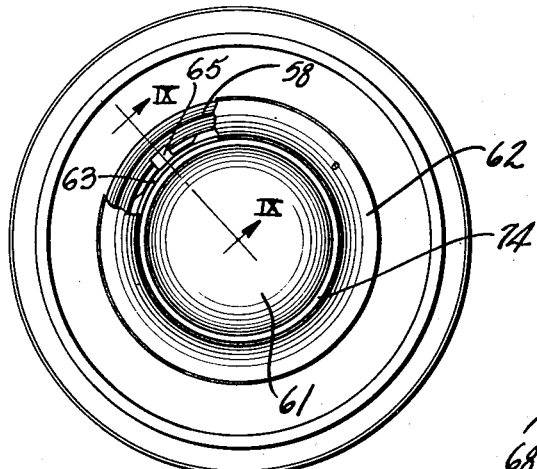

Figure 8 is a side view of a wheel and cover assembly of a further modified construction, with a portion of the trim ring of the cover broken away for exposing structure therebehind.

Figure 9:
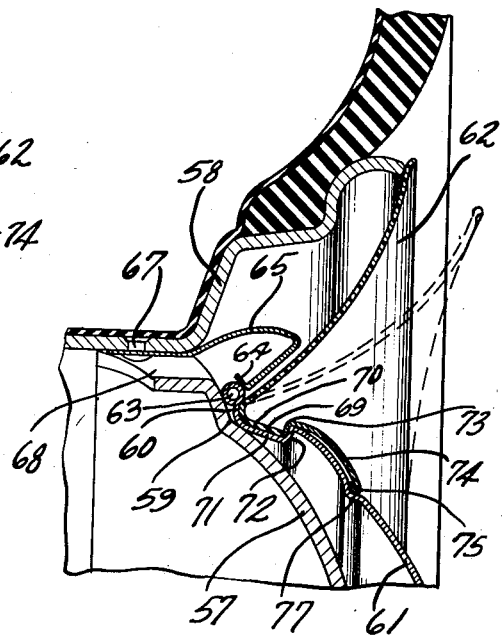

Figure 9 is a fragmentary, radial, sectional view taken substantially on the line IX—IX of Figure 8.

Figure 11:
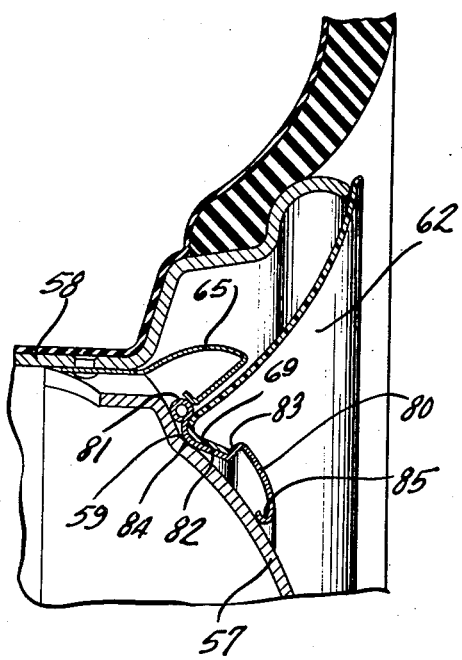
Figure 10:
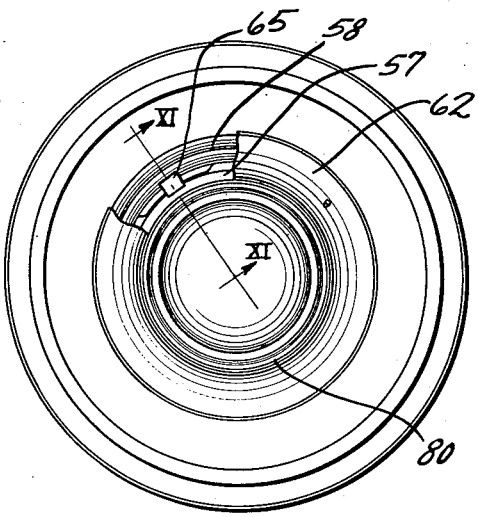

Figure 10 is a side view of a further modified cover and wheel assembly with a portion of the trim ring broken away to reveal structure therebehind; and Figure 11 is a fragmentary, radial, sectional view taken substantially along the line XI—XI of Figure 10.

As shown on the drawings:

In the form of the invention shown in Figures 1 to 6 inclusive, a cover assembly 15 is adapted to be applied to a wheel of conventional construction including a load-sustaining central body portion 16 which may be in the form of a dished metal stamping and which carries a multi-flanged, drop center type of tire rim 17 formed with an outer-side, generally axially extending intermediate flange 18 and an outer terminal flange 19. The tire rim 17 is adapted to support a pneumatic tire 20 having the customary beads thereof engaged with the intermediate and terminal flanges 18 and 19 and adapted to be inflated through the medium of an inner tube 21.

The body part 16 includes centrally depressed portion 22 terminating in a radial bolt-on flange 23 which is adapted to be fastened by bolts or cap screws (not shown) to a part on an axle, as is well known in the art. Extending radially inwardly from an axially outwardly projecting hump 24, which defines the central depression in the wheel body, is a plurality of bumps 25 for receiving a beaded edge 27 of a hub cap 28 in snap-on, pry-off relationship.

According to the present invention, the cover 15 comprises an outer component or trim ring cover portion or member 29 and an inner component or retaining cover portion or member 30. By preference, the outer cover portion 29 is made from a resiliently pliable material such as a synthetic plastic, self-sustaining as to form and adapted to be flexed even to the extent of being turned upon itself and yet capable of springing back to original shape when released. For this purpose, ethyl cellulose, cellulose acetate or vinyl resin are suitable plastics.

The trim ring member 29 is of a width to conceal the tire rim 17 and to extend radially inwardly beyond the juncture of the tire rim and the wheel body and is preferably of a generally dished or concavo-convex cross-section for generally simulating a radially inward continuation of the side wall of the tire, and where colored white gives the impression of a massive tire having a white side wall.

At its outer margin, the cover member 29 may be formed with a shallow depressed reinforcing flange 31 adapted to engage on the edge of the terminal flange 19 of the tire rim and preferably extend slightly radially outwardly therefrom for concealment and sealing purposes. From its outer margin, the trim ring 29 extends radially and axially inwardly and has its inner margin close to the wheel body 16, preferably at the radially outer side of the bulge 24.

For interlocking retaining engagement with the retaining member 30, the trim ring member 29 has an integral, flexible, generally axially outwardly and slightly radially inwardly turned annular marginal flange adapted to engage behind a generally axially inwardly facing shoulder 33 formed on the retaining member.

In the present instance, the inner retaining cover member 30 is in the form of an ornamental annular bead 30 and may be made from contrastingly painted metal or stainless steel or the like polished to give it an attractive appearance, the inner edge being turned under to provide a seating flange 34 which rests against the wheel body nose 24. The shoulder 33 is formed by an underturned, radially outer marginal portion on the bead.

Extending generally axially inwardly and slightly radially outwardly from the inner extremity of the shoulder 33 is a seating flange 35 against which the trim ring interlock flange 32 is adapted to abut in face to face relation. An annular abutment or body-engaging shoulder 37, adapted to rest against the wheel body, is provided at the inner margin of the flange 35 by a generally radially outwardly and slightly axially outwardly extending integral converging flange 38 which rigidly reenforces the seating flange 35, and in cooperation therewith and the shoulder 33 forms a generally radially outwardly opening groove for reception of the inner margin of the trim ring 29.

In the present instance the inner retaining cover member 30 is adapted to be applied to the wheel by engagement of generally radially outwardly extending fingers 39 in a wedging, biting relationship with the intermediate flange 18 of the tire rim. For this purpose, the retaining cover member 30 is provided with a plurality, such as four of the fingers 39 extending generally radially from the radially outer margin of the flange 38. The fingers 39 are adapted to be placed under substantial deflectional tension and by pressing the retaining cover member 30 axially inwardly against the wheel with the retaining edges of the fingers engaging the intermediate tire rim flange 18. To implement the resilient bias of the engagement fingers 39 the radially outer margin of the flange 38 is preferably flanged for rigidity, being bent substantially S shape at the base of the finger 39. Thus, it will be apparent that once the inner retaining cover member 30 has been applied to the wheel it is retained in position more or less permanently by the wedging, biting engagement of the fingers 39 with the intermediate rim flange 18. If for any reason it becomes necessary to remove the cover member 30, this may be done by prying the fingers 39 loose from the rim flange 18 by inserting a pry-off tool in respective notches 41 formed in the biting edges of the fingers.

Assembly of the trim ring portion 29 with the retaining portion 30 of the cover is adapted to be effected simply and quickly by manually pressing the trim ring portion onto the retaining portion. This is accomplished by having the inner trim ring marginal flange 32 of such flexibility and relative in proportions as to flex over the radially outer rounded edge of the bead portion of the retaining member 30 and snap into interlocking relation behind the shoulder 33, substantially as indicated in Figure 3. Therein the full line position of the trim ring member 29 shows the flange 32 as it is flexed generally radially outwardly by engagement with the protruding radially outer edge of the inner cover member bead 30, and the broken line position shows how the flange finds its seat against the retaining member flange 35, and engages edgewise behind the retaining shoulder 33.

Having more particular reference to Figure 4, which shows the final step in the method of applying the trim ring member 29 to the retaining member 30, it will be seen that after the inner marginal flange 32 of the trim ring has been partially engaged behind the retaining shoulder 33, as by a generally axial and radial assembly movement of the cover member, a simple manipulation by the thumbs and forefingers of the hands of the person effecting assembly of the cover member will accomplish the final interlocking engagement of the flange 32 and the shoulder 33. Thus, by holding the flange 32 bottomed against the seating flange 35 by means of the forefingers, identified at "F," so as to prevent the trim ring from springing away, pressure applied axially by means of the thumbs identified at "T," simultaneously into the groove between the body of the trim ring 29 and the flange 32 adjacent to the opposite sides of that portion of the flange 32 which still remains out of interlocking engagement, causes such portion of the flange 32 to flex past the nose of the retaining member bead and snap into the groove affording its seat. In this process, of course, the portion of the trim ring 29 adjacent to the flexed portion of the flange 32 flexes sympathetically generally axially outwardly substantially as shown in full lines of Fig. 3, snapping into the normal contour at the same time that the retaining flange snaps into its groove behind the retaining shoulder 33.

The relationship of the trim ring 29 to the retaining cover portion 30 and the terminal flange 19 of the tire rim is preferably such, that in the fully assembled relationship of the cover to the wheel, the body of the trim ring is slightly flexed into engagement with the outer terminal flange 19 so as to afford a reasonably snug, dust tight, and vibration proof closure.

Should it be desirable to disassemble the trim ring portion 29 of the cover at any time, this may be effected simply, and quickly by a relatively easy manipulation substantially shown in Figures 5 and 6. Thus, merely by grasping the outer edge of the trim ring portion of the cover and turning the grasped section thereof inwardly upon itself and effecting a slight radially inward pull thereon causes the trim ring to pop off of the retaining member 30. This transpires by reason of the engagement flange 32 on the turned-over portion of the trim ring substantially turning therewith so that from a generally axially outwardly extending position, the turned portion of the flange assumes a generally axially inward position out of engagement with the retaining shoulder 33 so that the radially inward pull easily flexes it slidably past the radially outer nose of the retaining member bead, as shown in broken outline in Fig. 5. At the same time the turning over of the grasped portion of the trim ring and the radially inner pull on the turned over portion causes the trim ring at the sides of the turned over portion to be distorted and deflected generally radially outwardly, substantially as shown in Fig. 6 whereby to deflect the contiguous portions of the engagement flange 32 radially outwardly beyond engagement with the retaining shoulder 33. As a result the trim ring easily comes away from the retaining member 30.

However, it will be apparent that no inward deflection nor axially outward pull on the trim ring member 29 that may be encountered in service will have any effect to dislodge the engagement flange 32 from interlocking engagement with the retaining shoulder 33. Only a complete overturning or turning out of the engagement flange 32 in the manner described will effect disassembly. While the assembled relationship of the trim ring member 29 and the retaining member 30 of the cover is quite thorough and effective, disassembly of the cover members can be effected quickly and with the utmost ease whenever desired.

In the modified form of the invention shown in Figure 7, a wheel body 45 is assembled with a tire rim 46 adapted to carry a pneumatic tire 47. The wheel body is formed with snap-on retaining bumps 48 extending generally radially outwardly. A hub cap member 49 formed with a resilient bead 50 is adapted to be engaged on the bumps 48 in snap-on, pry-off relationship.

In this form, the hub cap member 49 is formed with a reentrant groove 51 providing a retaining shoulder 52 and a seating flange portion 53 axially inwardly thereof for receiving an axially outwardly, radially inwardly extending engagement flange 54 at the inner marginal portion of a plastic trim ring cover member 55. Assembly of the trim ring 55 with the hub cap member 49 is adapted to be effected in the same manner as described in connection with the form of Figures 1 to 6. Likewise, disassembly of the cover member is adapted to be effected in the same manner.

When it is desired to remove the hub cap member 49, this can be effected quickly and easily by flexing the plastic cover 55 open as indicated in broken outline in Fig. 7 and inserting a pry-off tool such as a screwdriver behind the bead 50 for dislodging the same from the retaining bumps 48. Thereupon, the hub cap and trim ring cover assembly will remove as a unit. However, should it ever become desirable to remove the trim ring member 55, as, for example, for replacement purposes, such can be easily and quickly effected in the manner hereinbefore described.

In the modification of Figures 8 and 9, a wheel body 57 is formed adjacent to the juncture with a tire rim 58 with a shallow groove 59 serving as a locating groove for an engagement shoulder 60 at the outer margin of a cover member 61 in the form of a hub cap and retaining member for a plastic trim ring 62. The marginal extremity of the hub cap cover member 61 is formed with a reinforcing bead 63 arranged to engage in snap-on, pry-off relation with respective retaining tips 64 of spring retaining clips 65 secured as by means of rivets 67 to the base flange of the tire rim 58 within spaces 68 between the tire rim and the body portion 57. Thus, the hub cap member 61 is adapted to be pressed into assembly with the wheel by flexing of the spring clips 65 which snap into retaining relation to the bead 63 when the hub cap cover member has attained full seating relationship within the groove 59.

An engagement flange 69 extending generally axially outwardly and slightly radially inwardly along the radially inner margin of the trim ring 62 seats within a groove 70 provided by the shoulder 60, a seating flange 71 extending generally axially and radially outwardly between the shoulder 59 and a generally axially inwardly facing and radially outwardly extending shoulder flange 72 on the hub cap cover member. At its edge, the engagement flange 69 is adapted to engage against the shoulder provided by a radially inwardly extending annular flange retainingly engaging the shoulder flange 72 and formed at the inner margin of a reenforcing and ornamenting bead 74. The radially inner margin of the bead 74 is turned under as is shown at 75 and engages in a retaining groove 77 formed therefor in the hub cap member 61. For gaining access behind the trim ring member 62 for prying the cover assembly out of engagement from the spring clip 69, the outer edge of the trim ring is adapted to be flexed open as shown in broken outline for insertion of a pry-off tool therebehind.

Assembly or disassembly of the trim ring member 62 and the inner cover member 61 is adapted to be effected in the same manner as described in connection with the form of Figures 1 to 6.

Instead of the hub cap cover member 61 as shown in Figs. 8 and 9, a bead type of retaining cover member or ring 80 as shown in Figs. 10 and 11 may be used. The retaining ring 80 is formed with an inner marginal reenforcing bead 81 to be engaged in snap-on, pry-off relationship with the spring clips 65. Access to the bead 81 is had by flexing the trim ring member 62 open in the same manner as was described in connection with Fig. 9. A seating flange 82 is inset inwardly from the bead 81 to afford a retaining groove for the engagement flange 69 of the trim and is bounded at its radially inner sides by a generally axially inwardly facing and radially outwardly extending retaining shoulder 83 which is engaged by the edge of the engagement flange 69. In addition to a shoulder 84 engaging in the groove 59 of the wheel body, the inner cover member or retaining ring 80 engages the body 57 of the wheel through the medium of a radially inner marginal underturned reenforcing flange 85. Assembly or disassembly of the retaining ring and the trim ring 62 is adapted to be effected in the same manner as described in connection with the form of Figures 1 to 6.

From the foregoing it will be apparent that I have provided, in the several forms of the invention herein disclosed, a cover assembly which is unique in the manner in which the inner cover member and the trim ring member can be quickly and conveniently assembled or disassembled while nevertheless retaining thorough interlocked relationship during service. Thereby, replacement of the plastic trim ring can be effected quickly and conveniently by manual effort alone and without the need for tools or any complex manipulations.

I claim as my invention:

1. In a wheel structure including a wheel body and a tire rim, a cover assembly including inner and outer cover members wherein the outer cover member constitutes a trim ring adapted to conceal the tire rim and the inner cover member has means thereon retainingly engageable with the wheel and bears against the wheel body, said outer cover member being formed from resiliently flexible material and having an inner marginal flange divergently related to the body of the outer cover member, said flange extending in generally radially inwardly and axially outward direction and interlockingly engaging said inner cover member, said flange being releasable from the interlocking relation with the inner cover member by turning a portion of the outer cover member flexibly upon itself and pulling radially inwardly thereon.

2. In a wheel structure including a wheel body and a tire rim, a cover assembly including inner and outer cover members wherein the outer cover member constitutes a trim ring adapted to conceal the tire rim and the inner cover member has means thereon retainingly engageable with the wheel and bears against the wheel body, said outer cover member being formed from resiliently flexible material and having an inner marginal structure interlockingly engaging said inner cover member, said inner marginal structure being releasable from the interlocking relation with the inner cover member by turning a portion of the outer cover member flexibly upon itself and pulling radially inwardly thereon, said interlocking marginal structure comprising a generally axially outwardly and radially inwardly extending annular flange, and said inner cover member having a generally axially inwardly facing shoulder interlockingly engaged by the edge of said flange.

3. In a wheel structure including a wheel body and a tire rim, a cover assembly for concealing the tire rim and at least a part of the body, said assembly including a trim ring portion formed from resiliently flexible, plastic sheet material and a circular retaining member formed from metal and attached to the wheel whereby to retain the trim ring in place on the wheel, said retaining member including a generally axially inwardly facing shoulder, and said trim ring including a marginal flange extending in an oblique generally radially and axially outward direction and flexibly interlockingly engaging said shoulder, said retaining member comprising an ornamental bead at the retaining shoulder thereof.

4. In a wheel structure including a wheel body and a tire rim, a cover assembly for concealing the tire rim and at least a part of the body, said assembly including a trim ring portion formed from resiliently flexible, plastic sheet material and a retaining member formed from metal and attached to the wheel whereby to retain the trim ring in place on the wheel, said retaining member including a generally axially inwardly facing shoulder, and said trim ring including a marginal flange extending in an oblique generally radially and axially outward direction and flexibly interlockingly engaging said shoulder, said retaining member having a marginal reenforcing bead thereon and the wheel having retaining spring clips thereon engaged by the bead in snap-on, pry-off relationship.

5. In a wheel structure including a tire rim and a wheel body, and a cover assembly for concealing the tire rim and at least a portion of the wheel body, said cover assembly including a plastic trim member substantially simulating a continuation of the side wall of the tire and having its outer margin adjacent to the outer edge of the tire trim and its inner margin closely adjacent to the wheel body radially inwardly from the junction of the wheel body and tire rim, and an inner cover member attached to the wheel and having a retaining groove defined at the radially inner side thereof by a generally axially inwardly facing shoulder, said trim ring having a generally axially outwardly and radially inwardly extending annular engagement flange thereon flexibly engaged within said groove and engaging said shoulder edgewise.

6. In a cover for a wheel structure including a tire rim, a trim ring formed from resiliently flexible material and adapted to cover the outer side of the tire rim ornamentally, the inner margin of the trim ring being formed with a generally axially outwardly and radially inwardly directed flange flexible generally normal to its plane, and retaining means for the trim ring having a generally axially inwardly facing shoulder disposed to have said flange retainingly engaged edgewise therebehind, said flange being adapted to be flexibly snapped behind said shoulder by relative axial assembly movement of the trim ring and the shoulder.

7. In a cover assembly adapted to be applied to the outer side of a vehicle wheel including a tire rim and a body portion, a pair of circular cover members, one of said members having a marginal flange extending sharply obliquely generally axially outwardly, the other of said members providing a seat for said flange and having a generally axially inwardly facing shoulder at the axially outer side of said seat and in retaining engagement with the axially outer edge extremity of said flange whereby to retain the cover members in assembly.

8. In a wheel cover assembly of the character described, a trim ring member adapted to be disposed in covering relation to the tire rim of a vehicle wheel, an inner cover member arranged to be in retained engagement with the wheel and overlying the body portion of the wheel, said trim ring member extending generally radially and axially inwardly and having at its inner margin a generally radially inwardly and sharply oblique axially outwardly extending flange diverging from the body portion of the trim ring, said inner cover member having a seat generally complementary to said flange and against which said flange rests flatwise and a shoulder facing generally axially inwardly and opposing the outer edge of said flange in retaining engagement.

9. In a cover for disposition at the outer side of a vehicle wheel, a trim ring member having an inner marginal generally radially inwardly and axially outwardly extending flange, a circular cover member having an outer marginal flange formed with a groove generally complementary to said trim ring inner marginal flange and within which said trim ring flange is seated, the radially inner side of said groove being defined by a shoulder opposing the edge of said trim ring flange for retaining the trim ring flange in said groove, and a reinforcing and ornamenting bead carried by said circular member and retainingly engaging said shoulder.

10. In a cover structure for an automobile wheel, a circular cover member having a resiliently flexible edge portion directed generally axially outwardly, a second circular cover member having a generally axially outwardly facing substantially rigid outer shoulder of a diameter to be engaged by the back of said edge portion as a preliminary to full assembly of the cover members, said second cover member also having a generally axially inwardly directed inner shoulder behind said outer shoulder, said edge portion being resiliently flexible while bearing on said outer shoulder to snap past said outer shoulder into edgewise interlocking engagement with said inner shoulder for securing the cover members in concentric unitary assembly.

GEORGE ALBERT LYON.

REFERENCES CITED

The following references are of record in the file of this patent:

UNITED STATES PATENTS

| Number | Name | Date |
|---|---|---|
| 2,368,240 | Lyon | Jan. 30, 1945 |
| 2,368,245 | Lyon | Jan. 30, 1945 |
| 2,368,246 | Lyon | Jan. 30, 1945 |
| 2,368,247 | Lyon | Jan. 30, 1945 |